United States Patent [19]

Mosely

[11] 4,321,756  
[45] Mar. 30, 1982

[54] VEGETABLE DRYING APPARATUS

[76] Inventor: Jeannine Mosely, 48 Teel St., Arlington, Mass. 02174

[21] Appl. No.: 202,632

[22] Filed: Oct. 31, 1980

[51] Int. Cl.³ .............................................. F26B 5/08
[52] U.S. Cl. ............................................ 34/8; 34/58
[58] Field of Search .............. 210/787, 483; 229/87 F; 150/1, 2, 11; 34/8, 58, 133; 68/19.2, 21, 23 R, 96

[56] References Cited

U.S. PATENT DOCUMENTS

| | | | |
|---|---|---|---|
| 3,376,718 | 4/1968 | Kahn | 68/133 |
| 3,548,509 | 12/1970 | Chaknova | 34/58 |
| 4,007,546 | 2/1977 | Sauer | 34/242 |
| 4,109,397 | 8/1978 | Daily | 34/133 |

Primary Examiner—Larry I. Schwartz  
Attorney, Agent, or Firm—Neal J. Mosely

[57] ABSTRACT

A new vegetable drying apparatus consists of a net bag or perforated plastic bag placed inside an outer imperforate plastic film bag, both bags being provided with handles or other means for holding the same for manual rotation at relatively high speed. The washed vegetables which are to be dried are placed in the net bag, which is, in turn, placed inside the outer imperforate bag. The two bags are held together as a sling and manually rotated at a sufficiently high speed to remove water from the vegetables by centrifugal force. The water removed from the vegetables is collected inside the imperforate bag instead of being thrown out into the area where the bags are rotated or slung around. After use, the inner bag is removed from the outer imperforate bag and the vegetables, free of surface water, are removed. The water collected in the outer bag is poured out and the bag turned inside out to dry, if desired. An alternate embodiment includes a water absorbent liner, e.g. terry cloth or the like, positioned inside the outer imperforate bag.

13 Claims, 5 Drawing Figures

U.S. Patent     Mar. 30, 1982     4,321,756
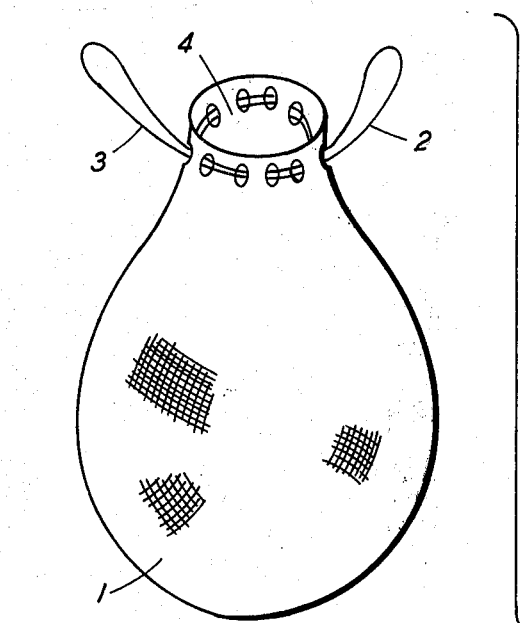
FIG. 1
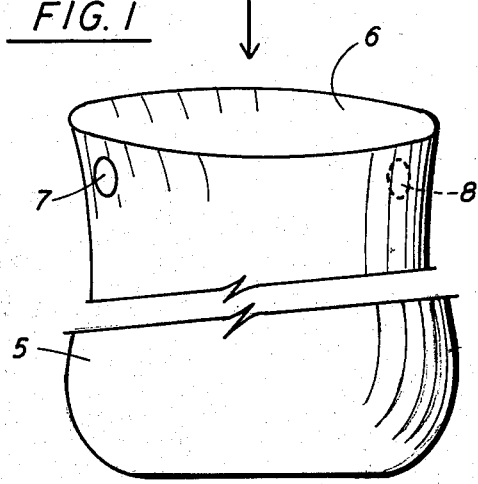
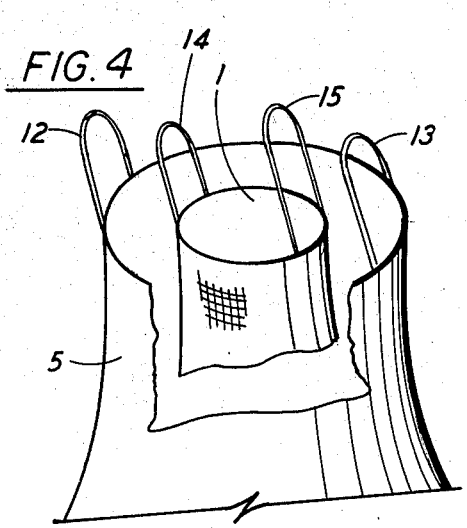
FIG. 4
FIG. 2
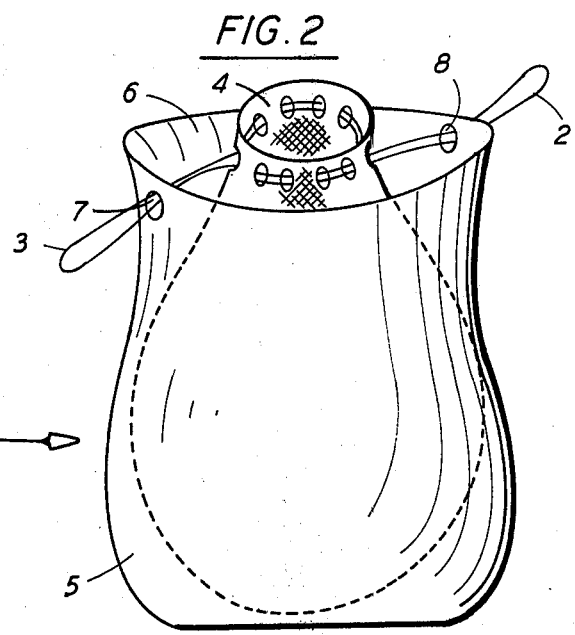
FIG. 3
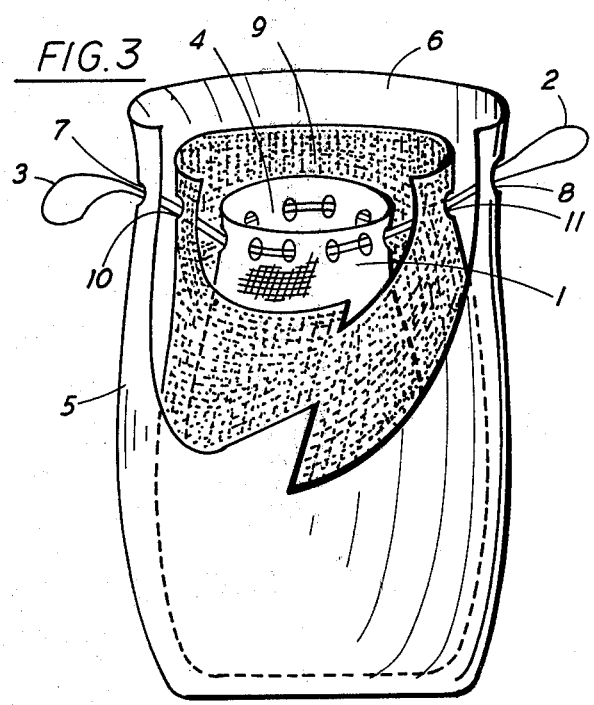

VEGETABLE DRYING APPARATUS

BACKGROUND OF THE INVENTION

1. Field of the Invention

This invention relates to new and improved apparatus for drying wet, e.g. washed, vegetables such as lettuce and other salad vegetables.

2. Brief Description of the Prior Art

Numerous appliances are already known which are designed for draining or throwing water from salad vegetables and the like. Most such appliances eliminate water from the vegetables by centrifugal force and because the water is thrown out of the appliance during use it is necessary that the appliance be used in a vat or in a deep sink or basin.

A salad dryer or drainer is known which has an outer container with solid walls and an inner removable basket with perforated walls. Some prior art devices are mechanically operated by hand cranks or the like and others have been developed which are motorized.

Recently, several patents have issued for motorized type apparatus for drying lettuce and other vegetables, e.g. Dieterich U.S. Pat. Nos. 4,103,432 and 4,189,850; Fouineteau U.S. Pat. No. 3,885,321; and Bingham U.S. Pat. No. 4,114,286.

These motorized devices, as well as the mechanically unmotorized devices, are expensive to manufacture and require a substantial amount of storage space in the kitchen or cupboard. As a result, there has been a substantial need for a simple, inexpensive and easily stored drainer or dryer for vegetables.

SUMMARY OF THE INVENTION

It is one object of this invention to provide a new and improved centrifuge for draining or drying of vegetables and salads which is simple and inexpensive to manufacture and easily stored in a very small place.

Another object of this invention is to provide a new and improved centrifuge for drying or draining vegetables and salads which is constructed of a soft flexible material which is easily stored.

Another object of this invention is to provide a new and improved method of draining or drying vegetables and salads and simultaneously collecting the water separated therefrom.

Other objects of this invention will become apparent from time to time throughout the specification and claims as hereinafter related.

The above stated objectives are attained by a new and improved vegetable draining or drying apparatus which consists of a bag of a perforate material placed inside an outer imperforate plastic film bag. The inner bag may be of net or cloth or perforated plastic material. The outer bag may be of plastic film or coated cloth or fabric. Both bags are provided with handles or drawstrings or the like for holding the same during use. The washed vegetables which are to be drained or dried are placed in the perforate bag which is in turn placed inside the outer imperforate bag. The two bags are held together by one or more of the drawstrings as a sling and manually rotated at a sufficiently high speed to remove water from the vegetables or salad by centrifugal force. The water removed from the vegetables is collected inside the imperforate bag instead of being thrown out into the area where the bags are rotated or slung. After use, the inner bag is removed from the outer imperforate bag and the vegetables, free of surface water, are removed. The water collected in the outer bag is poured out and the bag may be turned inside out to dry. An alternate embodiment of the invention includes a water absorbent liner, e.g. terry cloth or the like, positioned inside the outer imperforate bag.

BRIEF DESCRIPTION OF THE DRAWINGS

FIG. 1 is a composite or exploded view of an outer and inner bag in a preferred embodiment of a manually operated centrifuge for draining or drying vegetables or salads.

FIG. 2 is an isometric view of the outer and inner bags shown in FIG. 1 in an assembled position.

FIG. 3 is an isometric view, partially broken away, of an alternate embodiment of the invention including an absorbent liner for the outer bag.

FIG. 4 is an isometric view of the top portion of the outer and inner bags showing an alternate embodiment having handles on each of the bags.

BRIEF DESCRIPTION OF THE PREFERRED EMBODIMENTS

This invention comprises a new and improved centrifuge for draining or drying vegetables or salads or the like and a preferred embodiment is shown in FIG. 1. There is provided an inner bag 1 having drawstrings 2 and 3 for closing the top opening 4. The bag 1 is preferably of a net, such as a nylon net or the like. Any suitable perforate bag could be used including woven cloth or a perforated plastic film. The bag 1 need only be perforated to the extent to permit water to flow easily through the walls thereof. Where the bag is of a net or woven material it may be any suitable fiber or filament, but is preferably a filament or fiber of a synthetic or plastic which is nonabsorbent to water. The outer bag 5 has an upper opening 6 with holes 7 and 8 positioned diametrically opposite at the top thereof.

When this apparatus is used, the vegetables or salad, to be drained or dried, are placed inside the perforate bag 1 and the drawstrings 2 and 3 pulled to close the tops of the bag. The bag, containing the vegetables or salad, is then placed inside the outer imperforate bag 5 as shown in FIG. 2. In this embodiment, the drawstrings 2 and 3 extend through opening 7 and 8 in the outer, imperforate bag 5. The drawstrings 2 and 3 are pulled together and held as a single handle for supporting both the inner bag 1 and the outer bag 5. The bags 1 and 5, containing the vegetables or salad to be drained or dried, are then slung in a circular motion while holding the handles or drawstrings 2 and 3. These bags are slung in a circular motion at a rate of speed sufficient to throw off the water from the vegetables or salad by centrifugal force. The water which is thrown off the vegetables or salad passes through the perforated walls of the inner bag 1 and collects in the outer, imperforate bag 5. As is apparent from the drawing, the bag 5 is larger than the perferate bag 1 by an amount sufficient to allow the water to collect away from the contents thereof. After the bags have been slung in a circular motion for a time sufficient to remove the water from the vegetables or salad contained therein, the bags are opened and the inner bag 1 is removed and the dried or drained vegetables or salad are taken out, substantially free of surface water. The water which is collected in the outer bag 5 is drained and the outer bag 5 may be turned inside out to dry.

In some cases, it may be desirable to collect the water drained from the vegetables or salad in an absorbent material. In the embodiment of the invention shown in FIG. 3, the structure is identical to that shown in FIGS. 1 and 2, except that an additional bag 9 is provided which is of a water absorbent material. In FIG. 3, the water absorbent bag 9 is preferably of a construction similar to the outer bag 5 except that it is of an absorbent material. Bag 9 is preferably of a water absorbent fabric, such as a terry cloth. if desired, bag 9 could be of other suitable water absorbent material, including water absorbent paper or nonwoven fabrics or the like. Bag 9 is provided with holes 10 and 11 through which the drawstrings 2 and 3 may pass so that bags 1, 5 and 9 may be rotated together without separating.

In FIG. 4, there is shown another embodiment of the invention in which outer bag 5 is provided with handles 12 and 13 and inner bag 1 is provided with handles 14 and 15. These handles are substituted for the drawstrings 2 and 3 and may be held together during rotation of the bags to drain the vegetables or salad by centrifugal force.

The apparatus shown and described is one which is simple and inexpensive to manufacture and is very easy to store in a very small place. This apparatus can simply be hung on a nail or hook in a closet or cupboard or may be stored in a drawer. The apparatus, as described above, simply consists of an outer imperforate bag and an inner perforate bag, and an optional absorbent liner or bag for the outer bag. The bags have one or more drawstrings or handles suitably positioned on one or more of the bags so that the bags may be held together and rotated in a circular motion so that vegetables or salad contained in the inner bag will have water thrown off by centrifugal force which will pass through the walls of the inner bag and be collected in the outer bag.

While this invention has been described fully and completely with special emphasis upon three preferred embodiments, it should be understood that within the scope of the appended claims the invention may be practiced as otherwise than as specifically described herein.

I claim:

1. A centrifuge for drying vegetables capable of being hung from a hook or hanger or folded or collapsed for storage, comprising
a smaller bag of a flexible perforate material for enclosing vegetables to be dried,
a larger bag of a flexible imperforate material for enclosing said perforate bag, and
means at the open ends of said bags for supporting said bags together with said perforate bag inside said imperforate bag for rapid manual rotation for removal of water from vegetables supported in said perforate bag by centrifugal force and collection of the removed water in said imperforate bag.

2. A centrifuge according to claim 1 in which
said supporting means comprises a handle on at least one of said bags.

3. A centrifuge according to claim 1 in which
said supporting means comprises a handle on each of said bags.

4. A centrifuge according to claim 2 or 3 in which
said handle comprises a drawstring for closing said bag.

5. A centrifuge according to claim 1 in which said perforate material is of a net material.

6. a centrifuge according to claim 1 in which said perforate material is of cloth material.

7. A centrifuge according to claim 1 in which said perforate material is of plastic film.

8. A centrifuge according to claim 5 or 6 in which
said net material or cloth material is of a synthetic fiber or filament.

9. A centrifuge according to claim 1 in which said imperforate bag is of a plastic film.

10. A centrifuge according to claim 1 in which said imperforate bag is of a coated fabric.

11. A centrifuge according to claim 1 in which
said perforate bag is of a cloth or net material and includes a drawstring for closing the top opening therein which provided the supporting means for rotation thereof, and
means for supporting said imperforate bag surrounding said perforate bag during rotation thereof.

12. A centrifuge according to claim 11 in which said outer bag has diametrically opposed apertures through which said drawstring extends to support said imperforate bag on said perforate bag.

13. A method for drying vegetables by centrifugal force which comprises
placing wet vegetables to be dried in a perforate flexible bag,
slinging or rotating said bag in a circular motion at a rate sufficient to remove water from said vegetables by centrifugal force, and
collecting the water so removed by enclosing said perforate bag in a larger imperforate flexible bag during such slinging or rotary motion.

* * * * *